United States Patent [19]
Broyer

[11] 3,823,618
[45] July 16, 1974

[54] STEERING WHEELS FOR AUTOMOBILE VEHICLES
[75] Inventor: Robert Broyer, Billancourt, France
[73] Assignees: Regie Nationale Des Usines Renault, Billancourt; Automobiles Peugeot, Paris, both of, France
[22] Filed: Mar. 19, 1973
[21] Appl. No.: 342,503

[30] Foreign Application Priority Data
Mar. 28, 1972 France .............................. 72.10869

[52] U.S. Cl. .................................. 74/552, 74/558.5
[51] Int. Cl. ............................................. B62d 1/06
[58] Field of Search .................... 74/552, 558, 558.5

[56] References Cited
UNITED STATES PATENTS
2,877,539  2/1959  Berner .............................. 74/552 X
3,364,785  1/1968  Geller .................................. 74/552
3,523,464  8/1970  Quillery et al. ...................... 74/552

Primary Examiner—Samuel Scott
Assistant Examiner—F. D. Shoemaker
Attorney, Agent, or Firm—Stevens, Davis, Miller & Mosher

[57] ABSTRACT

A steering-wheel for an automobile vehicle constituted by a pre-formed assembly of a rim, and arms for coupling the rim to a steering column, fixed to the rim in which the pre-formed assembly is entirely overmoulded by a coating of synthetic material such as a polyurethane foam forming a skin and giving the coating a homogeneous appearance without discontinuity between the rim and said arms, the coating of said arms being such as to be temporarily detachable by lifting away from said arms in order to provide access to the mounting on said steering column.

6 Claims, 3 Drawing Figures

PATENTED JUL 16 1974　　3,823,618

STEERING WHEELS FOR AUTOMOBILE VEHICLES

The present invention relates to a steering wheel of a new style, having a perfectly homogeneous appearance, integrated with the general aspect of the driving seat.

Steering wheels are generally employed which are constituted by a rim comprising a coating obtained by over-moulding, to which there are added, by any known means, the arms for fixing the wheel to the steering hub, a padding of limited size being then provided on the arm and the hub, if so required, for reasons of safety and appearance.

This padding, obtained by means of a previous operation, is placed in position after the final fixing of the steering wheel on the steering column. This manner of proceeding necessitates the separate manufacture of the padding and its fixing and produces an effect of style which is more or less successful by reason of the visible discontinuities between the various apparent constituent parts of the steering wheel.

The object of the invention is to obviate the above disadvantages by proposing a steering wheel which is homogeneous, reliable and of good appearance, in which no discontinuity is visible between its various constituent parts, and the outer portion of which is obtained by a single over-moulding operation.

The present invention is described below by way of example, reference being made to the accompanying drawings of FIGS. 1 to 3, in which.

Figure 1:
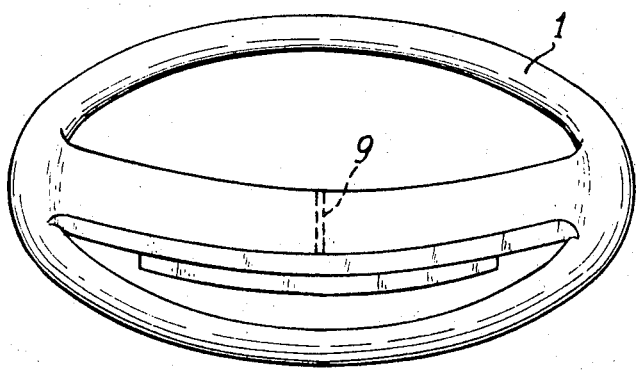
FIG. 1 is a perspective view of the assembly of one embodiment of the finished steering wheel.

Referring now to FIG. 1, there will be observed the remarkably homogeneous aspect of the steering-wheel 1, in which no discontinuity can be seen. This effect is obtained by over-moulding on a body, for example following the methods of manufacture described in the French Pat. No. 1.561.120 of Nov. 3, 1967 and in the U.S. Pat. application Ser. No. 36.850 of May 13, 1970. According to these methods, a rim is formed by winding bundles of glass fibres impregnated with polymerizable resin in a mould formed by two separable plates, a double arm made from a single piece of stamped steel sheet being fixed on the said rim.

According to the present invention, a pre-formed wheel of this kind is then arranged in a mould having the definite shape of the steering wheel, as shown in FIG. 1. The said pre-formed rim is positioned in such manner that the rear portion of the double arm 2 of sheet steel, comprising the member 3 for fixing to the steering column is not coated with synthetic material.

Figure 2:
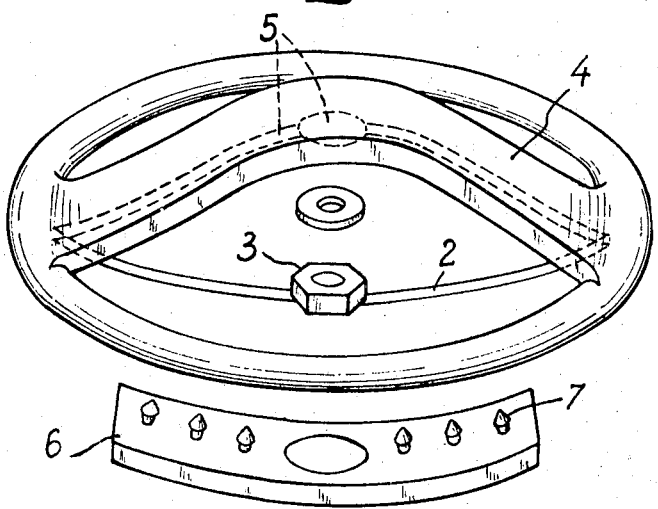
FIG. 2 is a perspective view of another embodiment of the steering wheel, showing the manner in which it would be fixed to the steering column.

As can be seen from FIG. 2, it is essential that the coating 4 should not become fixed to the arm 2 in order that access may be had to the fixing device 3. To this end, any suitable technique known to those skilled in the art may be adopted such as the coating of the arm 2 of sheet steel with a silicone grease, the temporary coating of the arm with a sheet having anti-adherent properties, etc.

It will be observed on the other hand that it is important for the arm to have a concave form in order to obtain a sufficient opening at the level of fixation (FIG. 2) on the steering column, by simply raising the coating, without counting too much on the elasticity or the deformability of the material employed.

After the closure of the mould, a synthetic material is then injected, preferably of the cellular type forming a superficial skin, such as a flexible or semi-rigid foam of polyurethane.

As shown in broken lines in FIG. 2, recessed portions 5 corresponding to the reliefs of the double arm 2 are formed during the course of this operation, this producing no visible additional thickness on the finished part.

Although a steering wheel thus obtained has a satisfactory appearance, it is possible to envisage the addition of a further part 6 intended to mask the rear non-coated face of the steering-wheel.

Figure 3:
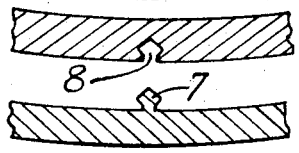
FIG. 3 is a detail of the assembly of the optional rear bearing on the padding of the steering-wheel arms.

This part may also be produced by moulding of semi-rigid polyurethane foam, and is provided at its surface in contact with the wheel with nipples 7 which engage in corresponding depressions 8 in the material which constitutes the wheel, as can be seen in detail from FIG. 3. These male and female elements 7 and 8 are produced during the moulding operation by means of an appropriate shaping of the moulds. The parts 6 and 4 are assembled together by simple pressure.

In an alternative form, in the case where the arms 2 are not concave and if access cannot be obtained to the fixing point by a simple deformation of the coating 4, there is then provided a slot 9 (FIG. 1) over the full depth and width of the said coating. It is then possible to fold back the free extremities towards the exterior, these then returning to their place by the action of the elastic return force of the meterial of which they are made.

What I claim is:

1. An automobile steering wheel, comprising: a pre-formed assembly, including a rim, a hub for mounting said assembly to a steering column, and arms fixed to said rim and said hub; and a cover member of a molded synthetic material substantially entirely covering said preformed assembly, the portion of said cover member covering said arms and hub being molded with and continuous with the portion of said cover member covering said rim, the portion of said cover member covering said arms and hub being sufficiently flexible in the region adjacent the area of attachment of said hub to said steering column to permit access to said area of attachment by lifting said cover member away from said arms.

2. The steering wheel according to claim 1, wherein: said rim is generally circular and said arms extend substantially radially inward from said rim to said steering column; the portion of said cover member covering said arms and hub contains no discontinuities and is continuous with the portion of said cover member covering said rim; and the portion of said cover member covering said hub is movable in a direction substantially normal to the plane of said rim to permit access to said area of attachment.

3. The steering wheel according to claim 2, further comprising an anti-adhesion agent deposited on said arms to pervent adhesion of said cover member to the surface of said arms and hub.

4. The steering wheel according to claim 1, wherein the portion of said cover member covering said arms and hub is continuous with the portion of said cover member covering said rim, said portion covering said arms and hub having a transverse discontinuity adjacent said area of attachment of said hub to said steering column to permit said portion covering said arms and hub to be folded back to thereby permit access to said area of attachment.

5. The steering wheel according to claim 4, further comprising an anti-adhesion agent deposited on said arms and hub to prevent adhesion of said cover member to the surface of said arms and hub.

6. The steering wheel according to claim 1, further comprising a further covering member composed of said synthetic material and coupled to the portion of said cover member covering said arms, said arms being sandwiched between said portion of said cover member covering said arms and said further covering member.

* * * * *